US012456497B2

(12) United States Patent
Morita et al.

(10) Patent No.: US 12,456,497 B2
(45) Date of Patent: Oct. 28, 2025

(54) DISK APPARATUS HAVING A SHOCK ABSORBER BETWEEN A HOUSING OF THE DISK APPARATUS AND A PROTECTIVE COVER FOR THE DISK APPARATUS

(71) Applicants: Kabushiki Kaisha Toshiba, Tokyo (JP); Toshiba Electronic Devices & Storage Corporation, Tokyo (JP)

(72) Inventors: Masaki Morita, Yokohama Kanagawa (JP); Hisashi Hasegawa, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 42 days.

(21) Appl. No.: 18/459,317

(22) Filed: Aug. 31, 2023

(65) Prior Publication Data
US 2024/0312490 A1  Sep. 19, 2024

(30) Foreign Application Priority Data

Mar. 13, 2023  (JP) ................. 2023-038722

(51) Int. Cl.
*G11B 33/08* (2006.01)
*G11B 25/04* (2006.01)
*G11B 33/02* (2006.01)
*G11B 33/12* (2006.01)

(52) U.S. Cl.
CPC ............ *G11B 33/08* (2013.01); *G11B 25/043* (2013.01); *G11B 33/027* (2013.01); *G11B 33/122* (2013.01)

(58) Field of Classification Search
None
See application file for complete search history.

(56) References Cited

U.S. PATENT DOCUMENTS

| 5,600,509 | A | 2/1997 | Kawakami | |
|---|---|---|---|---|
| 5,880,904 | A * | 3/1999 | Mizoshita et al. | G11B 33/08 360/99.08 |
| 6,052,255 | A | 4/2000 | Kawabe et al. | |
| 6,243,228 | B1 | 6/2001 | Yoshida et al. | |
| 6,324,054 | B1 | 11/2001 | Chee et al. | |
| 7,283,323 | B2 | 10/2007 | Lee | |
| 7,362,541 | B2 | 4/2008 | Bernett et al. | |
| 7,471,509 | B1 * | 12/2008 | Oliver | G11B 33/08 361/679.33 |
| 8,794,073 | B2 * | 8/2014 | Kasai et al. | G11B 33/08 73/660 |
| 9,460,756 | B1 | 10/2016 | Forbord et al. | |
| 9,683,138 | B2 * | 6/2017 | Furuta et al. | G11B 25/043 |
| 9,786,330 | B1 * | 10/2017 | Usami et al. | G11B 25/043 |
| 9,818,454 | B1 * | 11/2017 | Albrecht et al. | G11B 25/043 |
| 9,870,803 | B2 * | 1/2018 | Albrecht et al. | G11B 25/043 |
| 10,803,908 | B1 * | 10/2020 | Tamura et al. | G11B 33/1466 |

(Continued)

*Primary Examiner* — Craig A. Renner
(74) *Attorney, Agent, or Firm* — Kim & Stewart LLP (57) ABSTRACT

A disk apparatus includes a housing including a base, the base including a bottom wall and a frame-like side wall standing upright along peripheral edges of the bottom wall, and a top cover joined to the base, a rotatable disk-shaped recording medium disposed in the housing, a protective cover including a top plate secured to the top cover and a side plate facing one side surface of the base, and a shock absorber sandwiched between the side plate and the one side surface of the base.

9 Claims, 9 Drawing Sheets

(56) References Cited

U.S. PATENT DOCUMENTS

| | | | | |
|---|---|---|---|---|
| 2002/0093788 | A1* | 7/2002 | Rothschild | G11B 33/08 361/679.33 |
| 2003/0081348 | A1* | 5/2003 | Watanabe et al. | G11B 33/08 360/97.19 |
| 2004/0190193 | A1* | 9/2004 | Kuwajima | G11B 33/08 360/97.19 |
| 2008/0024972 | A1* | 1/2008 | Yamaguchi | G11B 33/08 361/679.39 |
| 2008/0158712 | A1* | 7/2008 | Nakatani | G11B 33/08 360/71 |
| 2011/0212281 | A1* | 9/2011 | Jacoby et al. | G11B 25/043 428/35.8 |
| 2021/0272603 | A1* | 9/2021 | Uehara et al. | G11B 25/043 |

\* cited by examiner

DISK APPARATUS HAVING A SHOCK ABSORBER BETWEEN A HOUSING OF THE DISK APPARATUS AND A PROTECTIVE COVER FOR THE DISK APPARATUS

CROSS-REFERENCE TO RELATED APPLICATION(S)

This application is based upon and claims the benefit of priority from Japanese Patent Application No. 2023-038722, filed Mar. 13, 2023, the entire contents of which are incorporated herein by reference.

FIELD

Embodiments described herein relate generally to a disk apparatus.

BACKGROUND

A magnetic disk drive includes a housing including a base and a top cover. An actuator, which supports a rotatable magnetic disk and a magnetic head, is disposed in the housing. The disk drive may also be equipped with a protective cover or a shield cover that covers the top cover.

When a disk drive is inserted into a slot of a rack or when a disk drive is dropped, it sometimes receives an impact from the side of the housing. It is difficult for the above-described protective cover or the shield cover to sufficiently reduce the impact received from the side of the housing.

DETAILED DESCRIPTION

Embodiments provide a disk apparatus having enhanced impact resistance.

In general, according to one embodiment, a disk apparatus includes a housing including a base, the base including a bottom wall and a frame-like side wall standing upright along peripheral edges of the bottom wall, and a top cover joined to the base, a rotatable disk-shaped recording medium disposed in the housing, a protective cover including a top plate secured to the top cover and a side plate facing one side surface of the base, and a shock absorber sandwiched between the side plate and the one side surface of the base.

Disk apparatuses according to embodiments will now be described with reference to the drawings. It is to be noted that the present disclosure is by way of example only, and that appropriate changes or modifications which are within the inventive concept and which would be obvious to those skilled in the art are encompassed by the scope of the present disclosure. Some drawings may be schematic for the sake of better understanding; thus, the width, the thickness, the shape, etc. of a component or element are not necessarily to scale. Such drawings are by way of example only, and should not be construed to limit the present disclosure. In the drawings and the description below, the same reference symbols are used for the same or similar components or elements, and a detailed description thereof will sometimes be omitted.

A hard disk drive (HDD) according to embodiments is described below in detail.

First Embodiment

Figure 1:
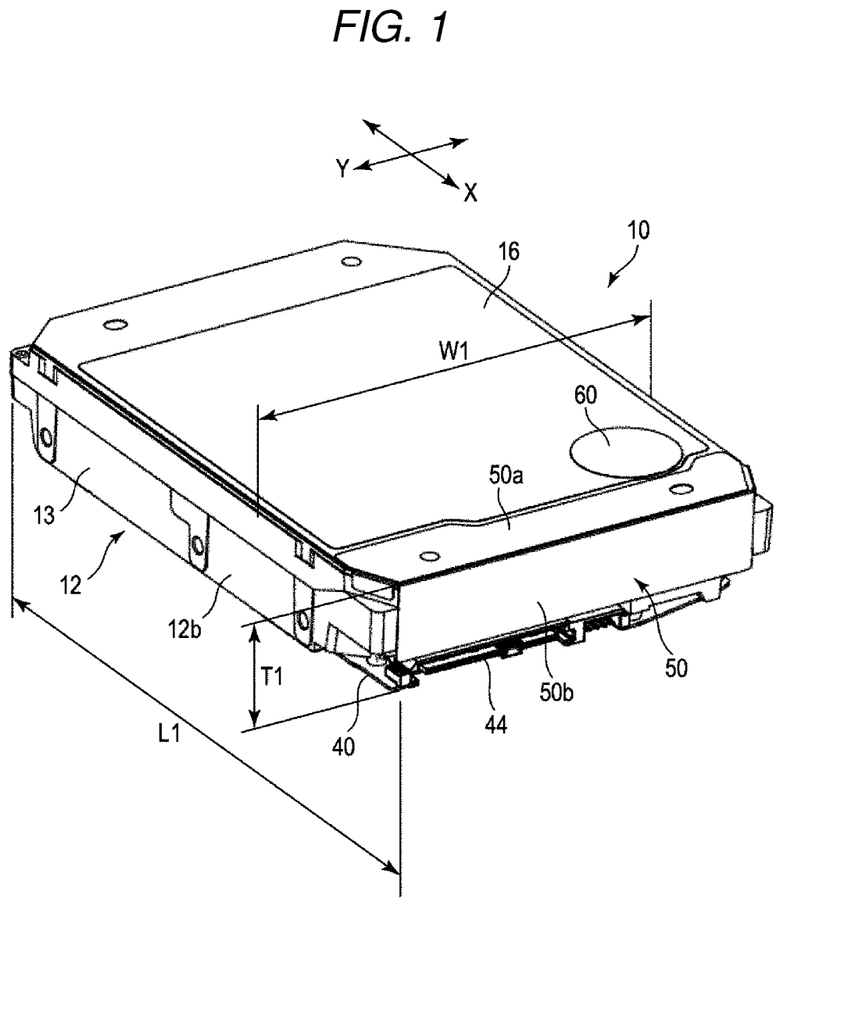
FIG. 1 is a perspective view of a hard disk drive (HDD) according to a first embodiment.
Figure 3:
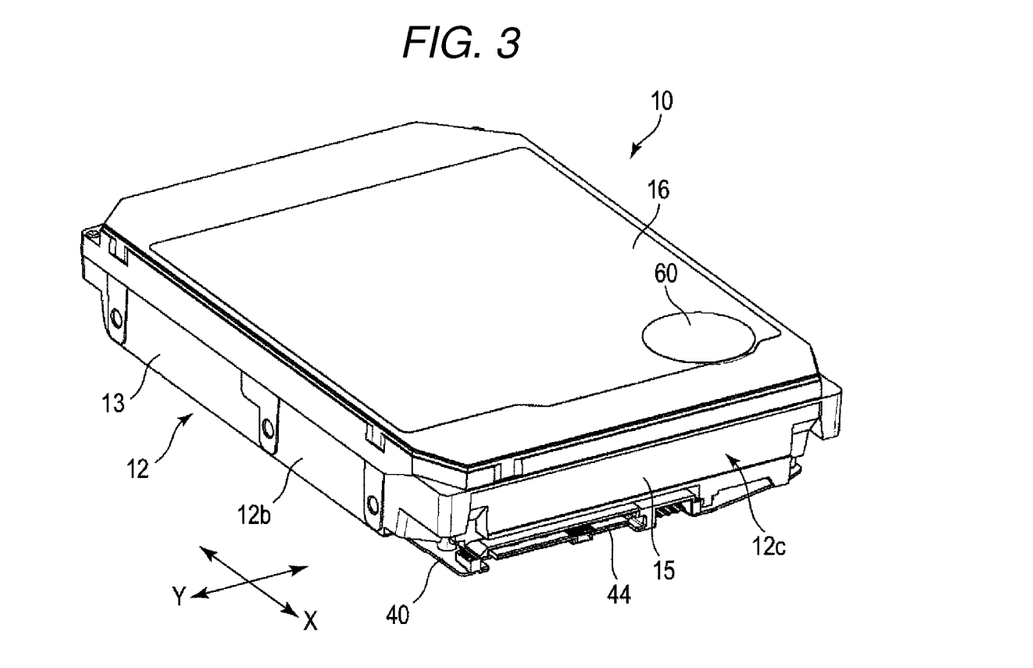
FIG. 3 is a perspective view of the HDD with the protective cover detached.

FIG. 1 is a perspective view showing the appearance of an HDD according to a first embodiment. FIG. 3 is a perspective view showing the HDD with a protective cover detached.

As shown in FIG. 1, the HDD (more generally referred to as a disk apparatus) includes a generally rectangular box-shaped housing 10. The housing 10 includes an open-top rectangular base 12, and a top cover 16 joined to the base 12 and closing the top opening of the base 12. A peripheral area of the top cover 16 is bonded to the base 12 e.g. by welding. As will be described later, the HDD includes a plurality of magnetic disks, a plurality of magnetic heads, an actuator assembly, a voice coil motor (VCM), etc., which are disposed in the housing 10. The longitudinal direction of the housing 10 is herein referred to as the first direction X, and the width direction perpendicular to the longitudinal direction is herein referred to as the second direction Y.

A protective cover 50 is attached to one end of the housing 10 in the first direction X to cover part of the joint between the base 12 and the top cover 16. The protective cover 50 comprises two parts that are integrally formed. The two parts are a generally rectangular top plate 50a secured to the top cover 16, and a rectangular side plate 50b facing one short side surface of the housing 10. The protective cover 50 is formed, for example, by bending a stainless steel plate. The side plate 50b is bent approximately 90 degrees with respect to the top plate 50a.

A printed circuit board 40 is provided on the bottom side of the housing 10. An interface connector 44 is mounted on the printed circuit board 40. The interface connector 44 is located adjacent to the side surface of the housing 10 which faces the side plate 50b of the protective cover 50.

When the length of the housing 10 in the first direction X is represented by L1, the width of the housing 10 in the second direction Y is represented by W1, and the height (thickness) of the housing 10 is represented by T1, these dimensions are each set within a range specified in an HDD standard. For example, the length L1 is set to a maximum of 147 mm or less, the width W1 is set to a maximum of 101.85 mm or less, and the height T1 is set to a maximum of 26.1 mm or less. The length L1, width W1 and height T1 are the dimensions of the housing 10 including the protective cover 50 and the printed circuit board 40.

Figure 2:
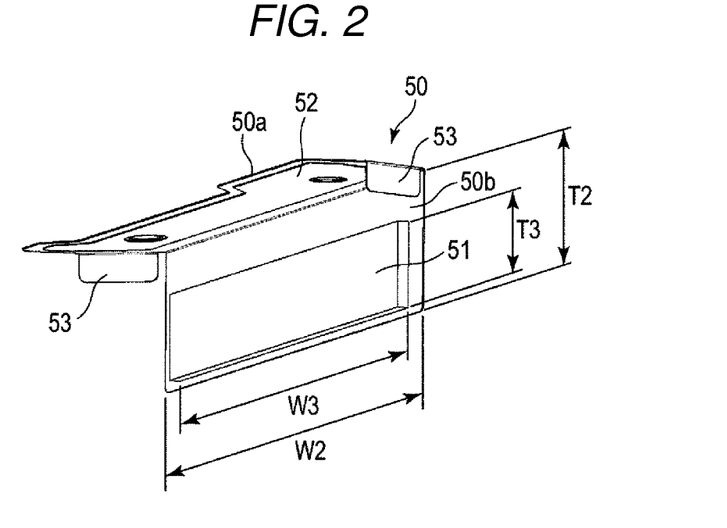
FIG. 2 is a perspective view of a protective cover and a shock absorber.

FIG. 2 is a perspective view showing the inner side of the protective cover 50. As shown in FIG. 2, the top plate 50a and the side plate 50b are each formed with a width W2 which is slightly smaller than the width W1 of the housing 10 in the second direction Y. The height T2 of the side plate 50b in the height direction (the direction perpendicular to the first direction X and to the second direction Y) is set slightly smaller than the height T1 of the housing 10, for example, about 70% to 95% of T1.

The protective cover 50 includes a shock absorber 51 provided on the inner side of the side plate 50b. The shock absorber 51 is formed in a rectangular plate-like shape and has a first main surface and a second main surface which face each other. The shock absorber 51 has a length W3, a width T3, and a predetermined thickness. The length W3 is slightly smaller than the width W2 of the side plate 50b. The width T3 is slightly smaller than the height T2 of the side plate 50b. The thickness of the shock absorber 51 is, for example, about 1 to 3 mm. In one example, urethane foam is used for the shock absorber 51. Various other materials may also be used for the shock absorber 51. Examples of usable materials include a rubber, an acrylic resin, a silicone resin, a polyethylene resin, paper, and a composite thereof. As will be described below, Sorbothane (trade name) having a thickness of 1 mm, manufactured by Sanshin Enterprises Co., Ltd., or 3M-CF-42EG (trade name) having a thickness of 1.9 mm, manufactured by Acaro Technologies LLC may also be used as the shock absorber 51.

The first main surface of the shock absorber 51 is attached to the inner surface of the side plate 50b e.g. with an adhesive or a double-sided tape. The shock absorber 51 is disposed on the lower-end side of the side plate 50b. The lower edge and both side edges of the shock absorber 51 are located slightly inward of the lower edge and both side edges of the side plate 50b, respectively. Thus, the entire surface of the shock absorber 51 is covered with the side plate 50b. The protective cover 50 has a pair of nail portions 53 extending substantially vertically from both side edges of the top plate 50a. In FIG. 2, an adhesive or a double-sided tape 52 is provided on the inner surface of the top plate 50a.

Figure 4:
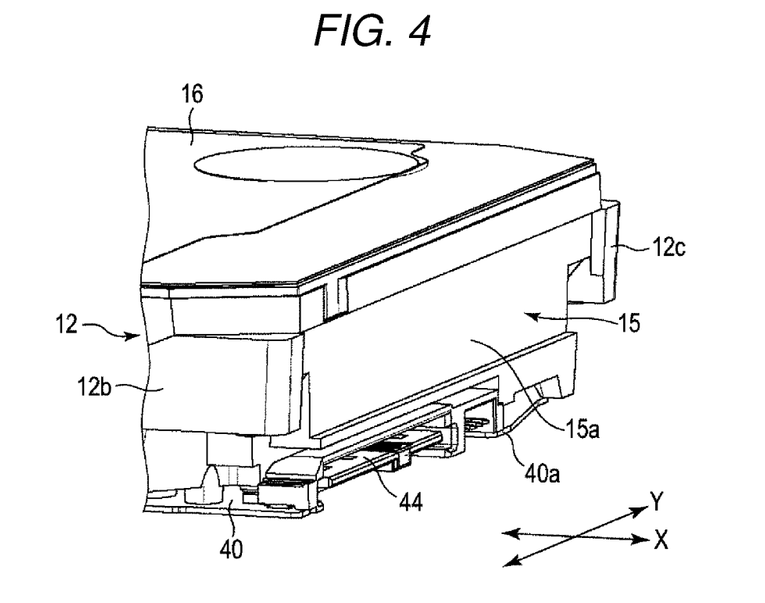
FIG. 4 is a perspective view showing one side of the HDD.

FIG. 3 is a perspective view showing the HDD before the protective cover is attached thereto, and FIG. 4 is a perspective view showing a short-side end of the housing. As shown in FIG. 3, the base 12 of the housing 10 comprises a rectangular bottom wall, which will be described later, and a frame-like side wall 13 standing upright along the peripheral edge of the bottom wall. The rectangular bottom wall and the frame-like side wall 13 are integrally formed. The side wall 13 includes a pair of long side walls 12b facing each other, and a pair of short side walls 12c facing each other. The pair of long side walls 12b extend in the first direction X, and the pair of short side walls 12c extend in the second direction Y. The top cover 16 is joined to the upper end of the side wall 13.

As shown in FIGS. 3 and 4, a recess 15 is formed in one side surface of the housing 10, in particular in the outer surface of the interface connector 44-side short side wall 12c in the illustrated example. The recess 15 has a size and shape capable of housing the shock absorber 51 of the protective cover 50. In one example, the recess 15 is formed in a generally rectangular shape, and has a width which is slightly smaller than the width W1 of the short side wall 12c, and a height which is slightly smaller than the height of the short side wall 12c. The recess 15 is formed to a depth on the order of several mm, and has a flat bottom surface 15a.

Figure 5:
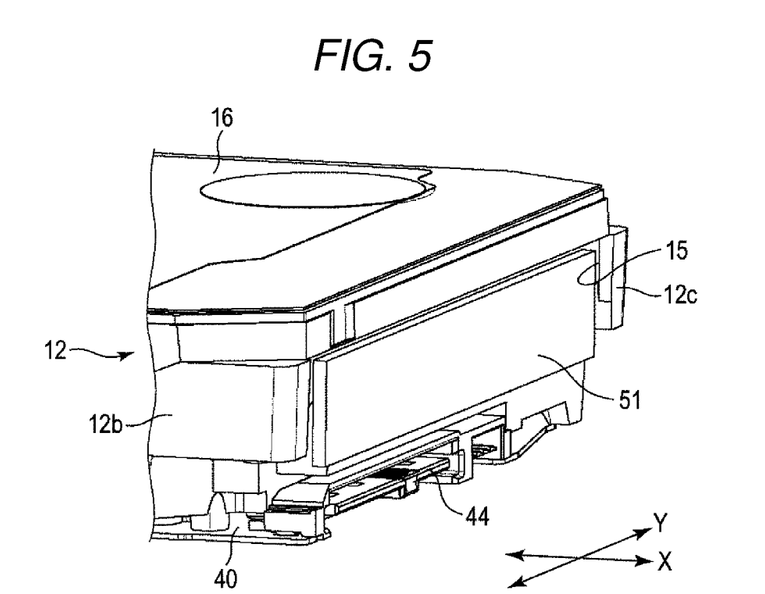
FIG. 5 is a perspective view of the HDD with the shock absorber attached to the one side of the HDD.

FIG. 5 is a perspective view showing the HDD with the shock absorber 51 disposed in the recess 15. As shown in FIG. 5, the shock absorber 51 is disposed in the recess 15 with the second main surface attached to the bottom surface 15a of the recess 15 e.g. with an adhesive or a double-sided tape. An area of the shock absorber 51, corresponding to approximately half its thickness, is housed in the recess 15 and covers most of the short side wall 12c.

Figure 6:
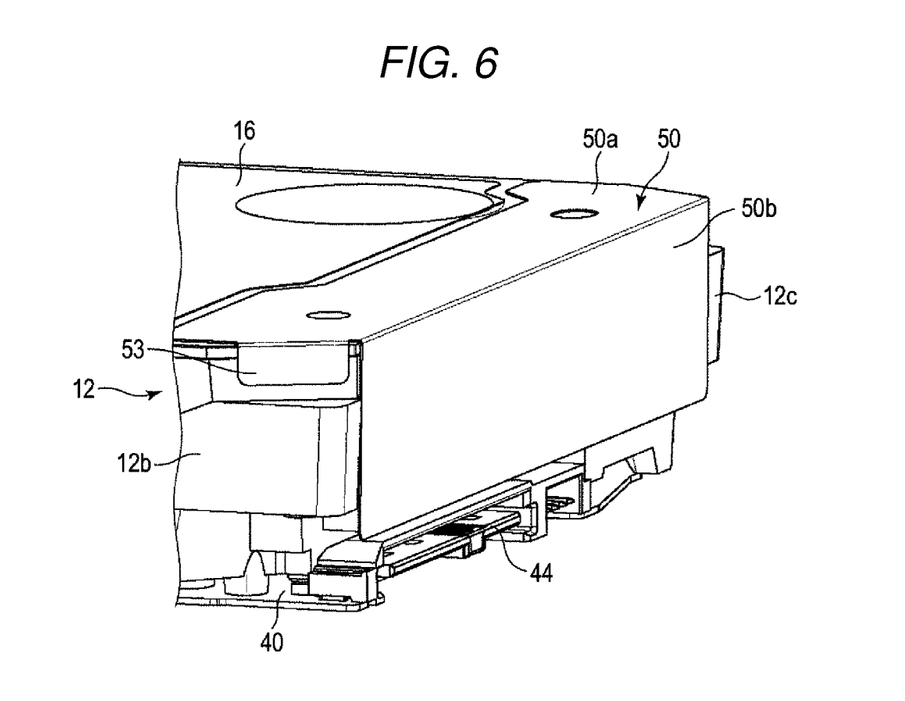
FIG. 6 is a perspective view showing the one side of the HDD with the protective cover attached.
Figure 7:
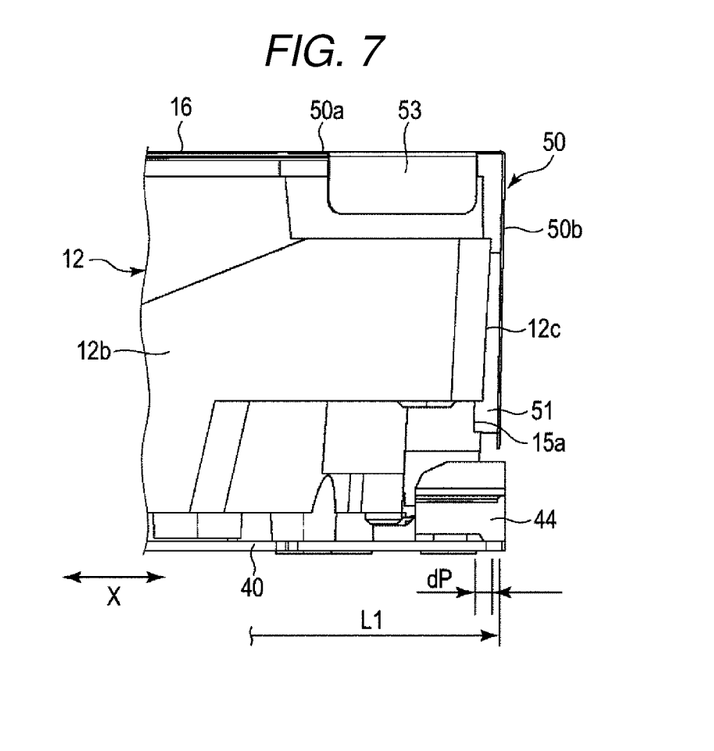
FIG. 7 is a side view showing the one side of the HDD with the protective cover attached.

FIG. 6 is a perspective view showing the HDD with the protective cover 50 attached, and FIG. 7 is a side view of the short-side end of the HDD with the protective cover 50 attached. As shown in the Figures, the protective cover 50 is attached to one end of the housing 10 in the first direction X and partially covers the joint between the base 12 and the top cover 16. The top plate 50a of the protective cover 50 is attached to the top cover 16, e.g. with the double-sided tape 52 shown in FIG. 2, and lies substantially flush with the top cover 16. The pair of nail portions 53 of the top plate 50a are in engagement with the outer surfaces of upper end portions of the opposing long side walls 12b.

The side plate 50b is positioned facing the outer surface of the short side wall 12c of the housing 10. The side plate 50b extends from the top plate 50a to near the lower end of the short side wall 12c and covers approximately the entire outer surface of the short side wall 12c. As shown in FIG. 7, the shock absorber 51 has been attached to the inner surface of the side plate 50b in advance. By attaching the shock absorber 51 to the bottom surface 15a of the recess 15 of the short side wall 12c, the side plate 50b is fixed to the short side wall 12c via the shock absorber 51. The shock absorber 51 is sandwiched between the short side wall 12c and the side plate 50b, and is entirely covered with the side plate 50b.

As shown in FIG. 7, when the side plate 50b is on the short side wall 12c, at least part of the shock absorber 51, in the illustrated example an area corresponding to approximately half the thickness of the shock absorber 51, is housed in the recess 15. Thus, the recess 15 absorbs approximately half the length of the shock absorber 51 in the first direction X (i.e. in the thickness direction of the shock absorber 51). Accordingly, the length L1 of the HDD, including the side plate 50b, in the first direction X can be reduced by the depth of the recess 15, so that the length L1 can fall within a predetermined standard range. The connection-side edge of the interface connector 44 is positioned approximately aligned with the side plate 50b. Alternatively, the connection-side end of the interface connector 44 may project slightly from the side plate 50b in the first direction X.

Figure 8:
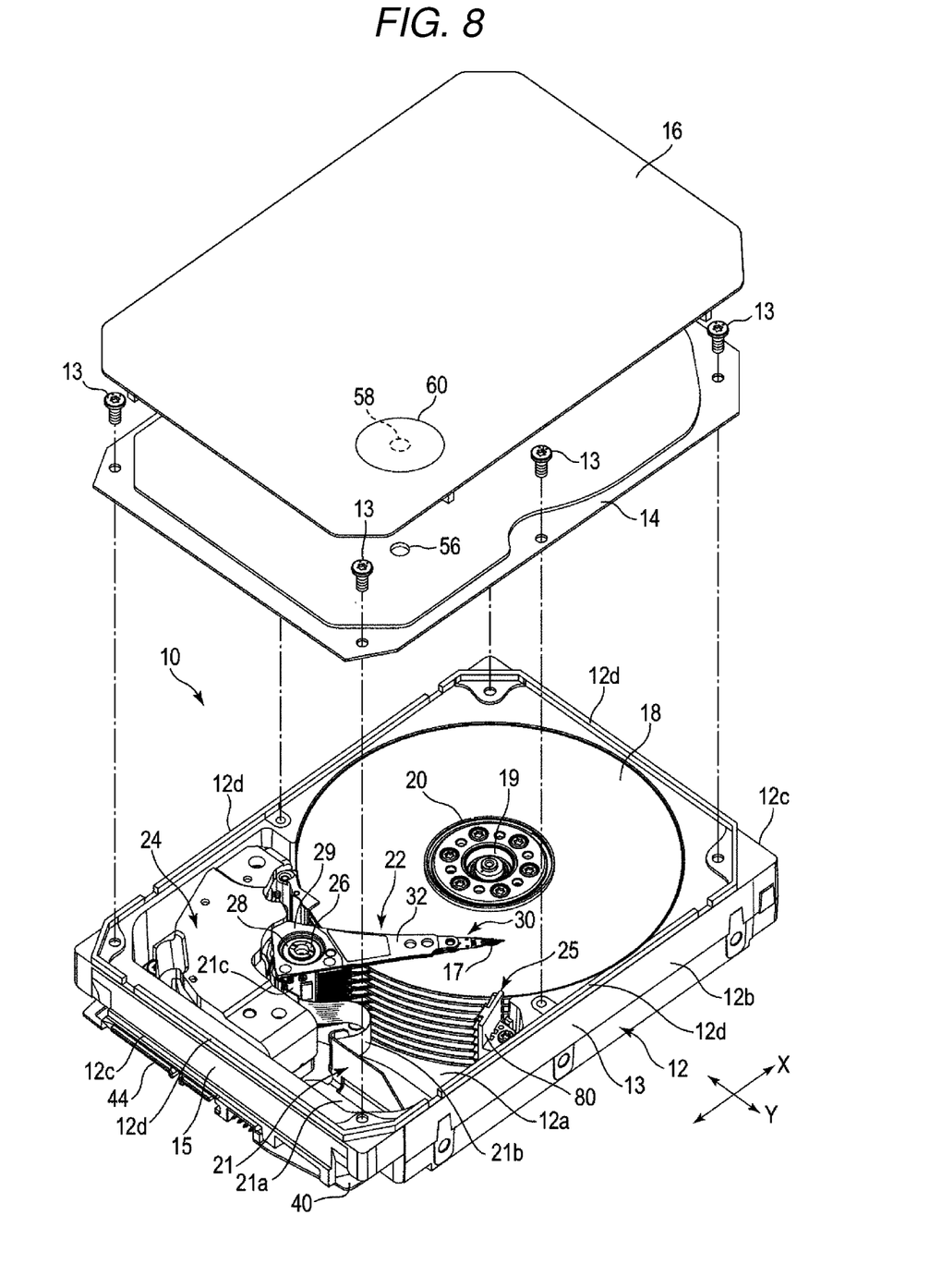
FIG. 8 is an exploded perspective view showing the internal structure of the HDD.

The construction of the housing 10 and the internal structure of the HDD will now be described. FIG. 8 is an exploded perspective view of the HDD, showing the internal structure of the HDD. As shown in FIG. 8, the housing 10 includes an open-top rectangular box-shaped base 12, an inner cover 14 which is screwed by screws 13 to the base 12 and closes the top opening of the base 12, and an outer cover (top cover) 16 superimposed on the inner cover 14 and welded, at its periphery, to the base 12. The base 12 includes a rectangular bottom wall 12a facing the inner cover 14 with a gap therebetween, and a frame-like side wall 13 standing upright along the peripheral edge of the bottom wall 12a. The bottom wall 12a and the side wall 13 are made of, for example, aluminum and are formed integrally. The side wall 13 includes a pair of long side walls 12b facing each other and a pair of short side walls 12c facing each other. An upwardly-projecting fixing rib 12d having a generally rectangular frame-like shape is provided on the top surface of the side wall 13.

The inner cover 14 is made of, for example, stainless steel and is formed in a rectangular plate-like shape. The inner cover 14, at its periphery, is screwed by screws 13 to the top surface of the side wall 13 of the base 12, whereby the inner cover 14 is fixed inside the fixing rib 12d. The top cover 16 is made of, for example, aluminum and is formed in a rectangular plate-like shape. The top cover 16 has a planar size which is slightly larger than that of the inner cover 14. The entire periphery of the top cover 16 is welded to the fixing rib 12d of the base 12, so that the top cover 16 is hermetically joined to the base 12. An airtight internal space (gas-filled area) is defined by the base 12 and the inner cover 14.

The inner cover 14 and the top cover 16 have vent holes 56 and 58, respectively, which communicate the interior of the housing 10 with the outside. Air in the internal space of the housing 10 is discharged through the vent holes 56, 58. A low-density gas (inert gas) such as helium gas, having a lower density than air, is supplied through the vent holes 56, 58 to the internal space of the housing 10. A seal 60, for example, is attached to the outer surface of the top cover 16 so as to close the vent hole 58.

A plurality of, for example ten, magnetic disks 18 as recording media, and a spindle motor 19 for supporting and rotating the magnetic disks 18 are provided in the housing 10. The spindle motor 19 is disposed on the bottom wall 12a. Each magnetic disk 18 has a diameter of, for example, 95 mm (3.5 inches) and has a magnetic recording layer in its upper and/or lower surface. Each magnetic disk 18 is coaxially fitted to a not-shown hub of the spindle motor 19, and is clamped by a clamp spring 20, whereby each magnetic disk 18 is supported in parallel with the bottom wall 12a of the base 12. The magnetic disks 18 are rotated by the spindle motor 19 at a predetermined rotating speed. The number of the magnetic disks 18 is not limited to 10, and may be not more than 9 or not less than 11.

A plurality of magnetic heads 17 for performing recording and reproduction of information on the magnetic disks 18, and an actuator assembly 22 supporting the magnetic heads 17 movably relative to the magnetic disks 18 are provided in the housing 10. Also provided in the housing 10 are a voice coil motor (hereinafter referred to as a VCM) 24 for rotating and positioning the actuator assembly 22, a ramp loading mechanism 25 for holding the magnetic heads 17 in a parked position away from the magnetic disks 18 when the magnetic heads 17 have moved outward to the peripheral edges of the magnetic disks 18, and a board unit (FPC unit) 21 on which electronic components, such as a conversion connector, are mounted. The ramp loading mechanism 25 includes a ramp 80 standing upright on the base 12.

The actuator assembly 22 includes an actuator block 29 having a through-hole, a bearing unit 28 provided in the through-hole, a plurality of, for example 11, arms 32 extending from the actuator block 29, a suspension assembly (also called HGA (head gimbal assembly)) 30 mounted to each arm 32, and the magnetic heads 17 each supported by a corresponding suspension assembly 30. A support shaft 26 stands upright on the bottom wall 12a. The actuator block 29 is supported by the bearing unit 28 rotatably about the support shaft 26.

The FPC unit 21 comprises a base portion 21a, an elongated strip-shaped relay portion 21b extending from one side edge of the base portion 21a, and a joint portion 21c provided continuously with the front edge of the relay portion 21b, all of which are integrally formed. The base portion 21a, the relay portion 21b, and the joint portion 21c are formed of a flexible printed circuit board (FPC). Electronic components, such as a conversion connector and capacitors, are mounted on the base portion 21a and electrically connected to wires of the FPC. The base portion 21a is mounted on the bottom wall 12a of the base 12. The relay portion 21b extends from the side edge of the base portion 21a toward the actuator block 29. The joint portion 21c, provided at the extended end of the relay portion 21b, is attached and screw-fixed to the side surface of the actuator block 29. The joint portion 21c has a large number of connection pads. The magnetic heads 17 of the actuator assembly 22 are electrically connected to the connection pads of the joint portion 21c via a wiring member (flexure). Thus, the FPC unit 21 is electrically connected to the magnetic heads 17 and the voice coil of the VCM 24.

Figure 9:
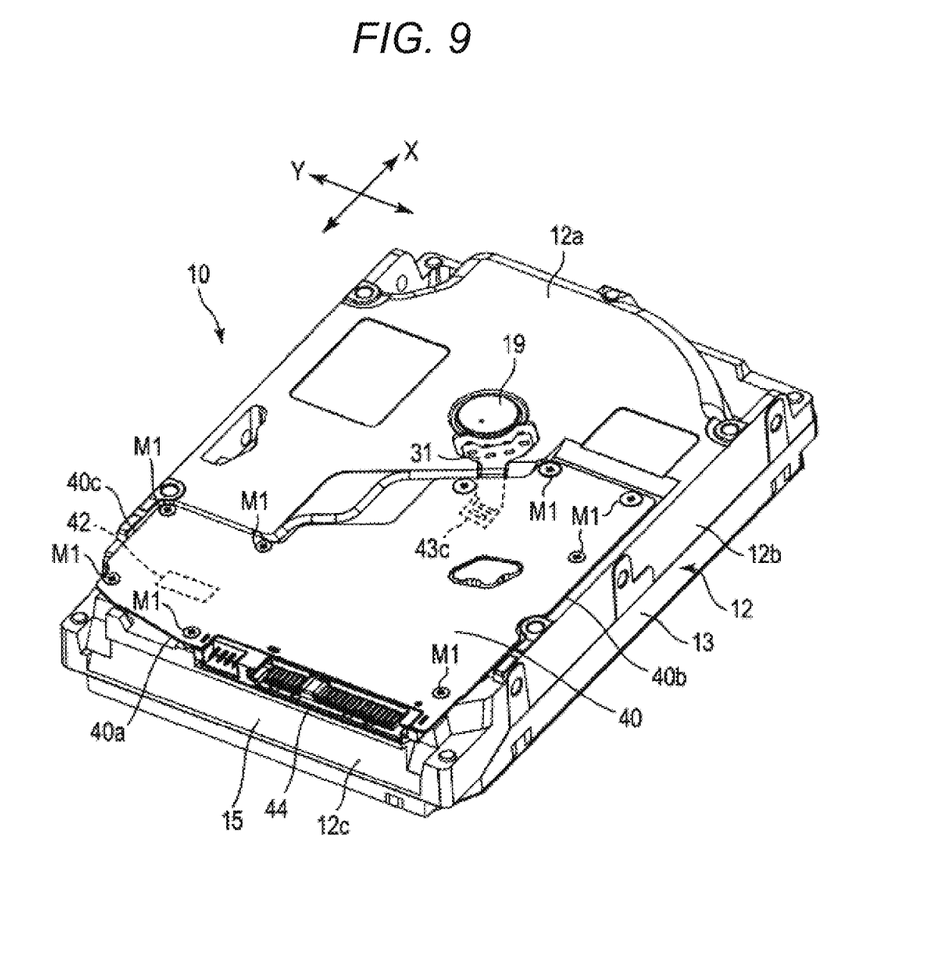
FIG. 9 is a perspective view showing the bottom side of the HDD and a control circuit board.

FIG. 9 is a perspective view showing the bottom side of the HDD and the printed circuit board. As shown in FIG. 9, the printed circuit board (also called a control circuit board) 40 is mounted on the outer surface of the bottom wall 12a of the base 12, and is screw-fixed by screws M1 to the bottom wall 12a. The printed circuit board 40 has an edge 40a positioned approximately arranged with one short side (the short side distant from the magnetic disks 18) of the bottom wall 12a, and a pair of edges 40b, 40c extending in a direction approximately perpendicular to the edge 40a and positioned approximately arranged with the pair of long sides of the bottom wall 12a. The printed circuit board 40 has an exposed outer surface and an opposite inner surface. The printed circuit board 40 is mounted to the base 12 with the inner surface facing the bottom wall 12a. The printed circuit board 40 has a size which is approximately half the area of the bottom wall 12a. The printed circuit board 40 is disposed in a shallow recess formed in the bottom wall 12a, so that the outer surface of the printed circuit board 40 lies flush with the outer surface of the bottom wall 12a.

An interface connector 44 to be connected to an external device, a relay connector 42 connected to a base 12-side connector, a connector terminal portion 43c connected to the spindle motor 19, and not-shown other electronic components are mounted on the inner surface of the printed circuit board 40. The printed circuit board 40 constitutes a control circuit board which controls the operation of the spindle motor 19 and controls, via the FPC unit 21, the operations of the VCM 24 and the magnetic heads 17.

The interface connector 44 is mounted on the printed circuit board 40 along the edge 40a. The connection-side end of the interface connector 44 lies substantially flush with the edge 40a. The relay connector 42 is connected to the board unit 21 via a not-shown relay connector provided on the bottom wall 12a. The connector terminal portion 43c is connected to one end of a connection FPC 31 attached to the bottom wall 12a. The other end of the connection FPC 31 is electrically connected to the spindle motor 19. The printed circuit board 40 is thus electrically connected to the board unit 21 and the spindle motor 19.

Figure 10:
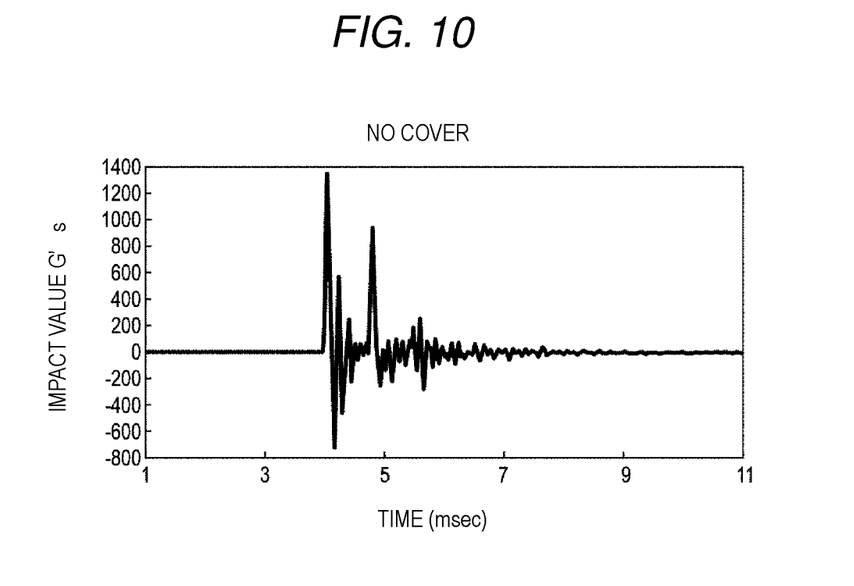
FIG. 10 is a diagram showing the results of measurement of impact value for an HDD (no cover) according to a comparative example.
Figure 11:
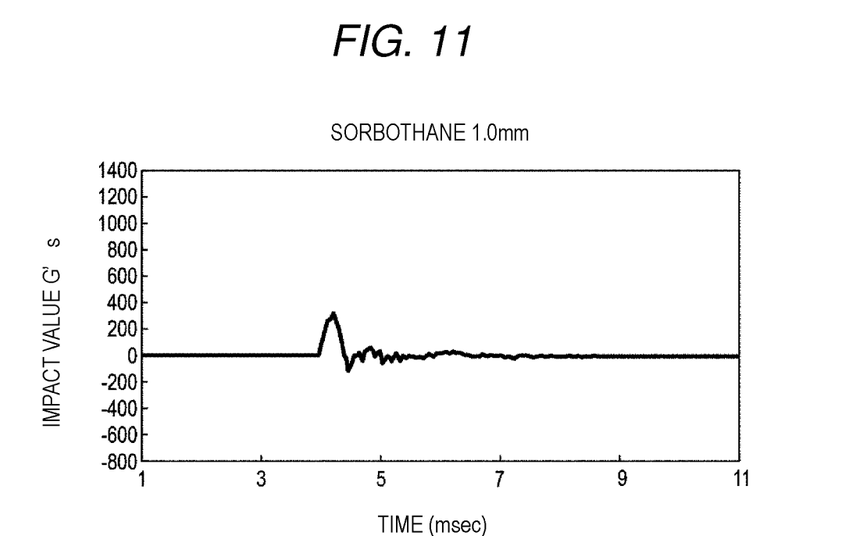
FIG. 11 is a diagram showing the results of measurement of impact value for the HDD according to the first embodiment.
Figure 12:
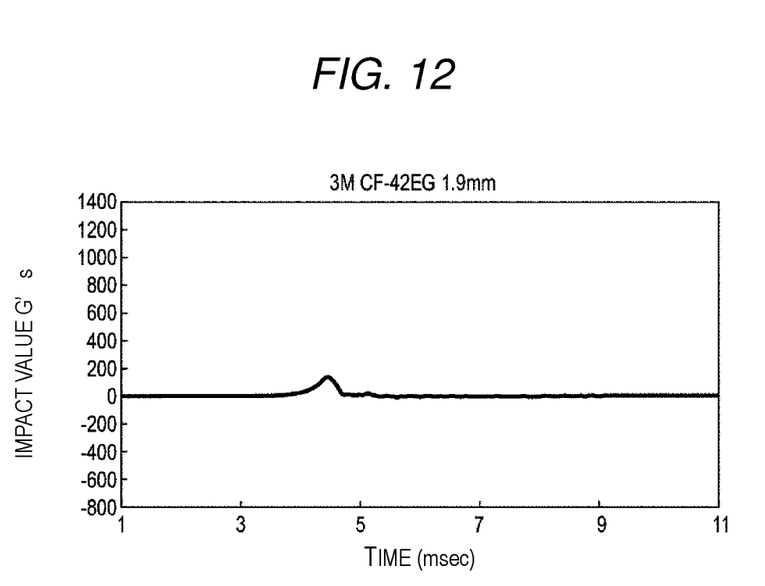
FIG. 12 is a diagram showing the results of measurement of impact value for another HDD according to the first embodiment.

For two HDDs according to this embodiment, each having the above-described construction, and an HDD according to a comparative example, a drop test was conducted to determine an impact that acted on each HDD. In particular, an HDD according to this embodiment using, as the shock absorber 51, Sorbothane (trade name) having a thickness of 1 mm, an HDD according to this embodiment using, as the shock absorber 51, 3M-CF-42EG (trade name) having a thickness of 1.9 mm, and an HDD according to a comparative example using no protective cover and no shock absorber were prepared. Each HDD was dropped, with the protection cover-side side surface facing downward, onto a surface plate from a height of 50 mm, and an impact that acted on the HDD was measured. FIGS. 10, 11 and 12 show the results of measurement for the respective HDDs.

As can be seen from the data depicted graphically in the FIGS. 10-12, compared to the comparative HDD (with no protective cover and no shock absorber), the HDDs according to this embodiment, each having the protective cover and the shock absorber, had a significantly reduced impact value. The data thus verifies the shock absorbing effect of the HDDs according to this embodiment.

According to the HDD of this embodiment having the above-described construction, one side surface of the housing 10 is covered with the side plate of the protective cover 50, and the shock absorber 51 is sandwiched between the side plate and the side wall of the housing 10. This makes it possible to absorb and reduce an impact from the side of the HDD. Therefore, the impact resistance of the HDD can be enhanced. Further, by covering the shock absorber 51 with the protective cover 50, deterioration and detachment of the shock absorber 51 can be prevented. Therefore, the impact reducing effect of the protective cover 50 and the shock absorber 51 can be stably maintained over a long period of time.

According to this embodiment, the recess 15 is provided in one side surface of the housing 10, and at least part of the shock absorber 51 is disposed within the recess 15. Therefore, even though the shock absorber 51 is disposed between the protective cover 50 and the side wall of the housing 10, the dimensions of the HDD can be made to each fall within a range specified in an HDD standard.

As described hereinabove, according to the first embodiment, it is possible to provide a magnetic disk apparatus having enhanced impact resistance.

An installation location for the protective cover 50 and the shock absorber 51 is not limited to the interface connector-side side wall of the housing 10; they may be provided on the opposing short side wall of the interface connector of the housing 10 or on one of the long side walls of the housing 10. The number of installation locations for the protective cover 50 and the shock absorber 51 is not limited to one; they may be provided at a plurality of locations.

An HDD according to another embodiment will now be described. In the following description, the same reference symbols are used for the same components or elements as those described above with reference to the first embodiment, and a description thereof will be simplified or omitted. The following description will be focused on differences from the first embodiment.

Second Embodiment

Figure 13:
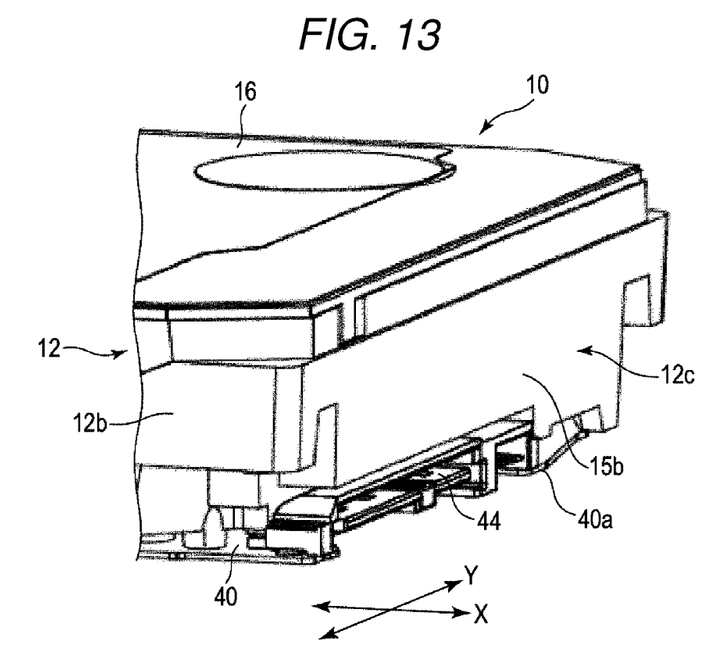
FIG. 13 is a perspective view showing one side of an HDD according to a second embodiment.
Figure 14:
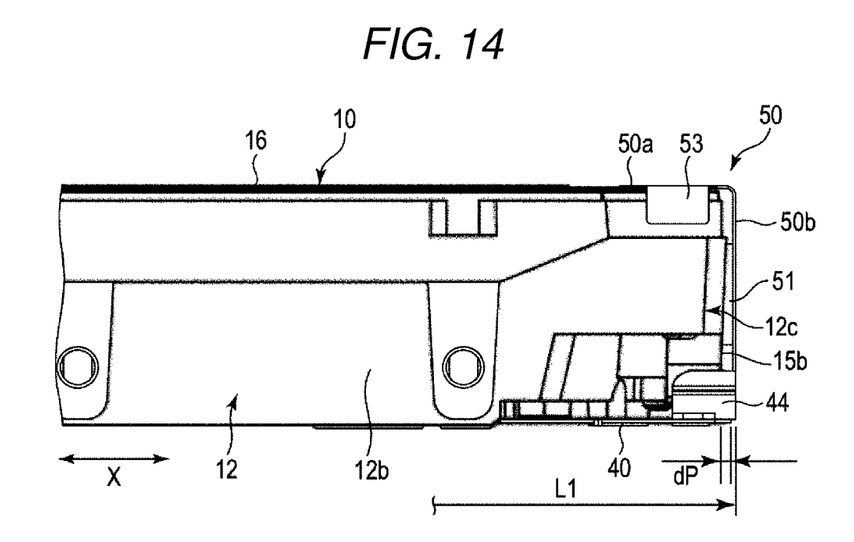
FIG. 14 is a side view of the HDD according to the second embodiment.

FIG. 13 is a perspective view of an HDD according to a second embodiment, showing one side of the HDD with a protective cover detached, and FIG. 14 is a side view of the HDD according to the second embodiment. The second embodiment differs from the first embodiment in the construction of the side wall 12c of the housing 10. In the first embodiment, the recess 15 is provided in part of the short side wall 12c. In the second embodiment, as shown in FIG. 13, the thickness in the first direction X of the entire short side wall 12c, located on the interface connector 44 side of the housing 10, is set small. The outer surface of the short side wall 12c, namely the side surface 15b, is formed flat and inward relative to an edge of the interface connector 44 in the first direction X by a predetermined length dP. To achieve this, the short side wall 12c is formed thinner by a thickness corresponding to a predetermined percentage of the thickness of the shock absorber 51, for example approximately half the thickness of the shock absorber 51 (dP).

As shown in FIG. 14, the protective cover 50 is attached to one end of the housing 10 in the first direction X and partially covers the joint between the base 12 and the top cover 16. The top plate 50a of the protective cover 50 is attached to the top cover 16 with a double-sided tape, and lies substantially flush with the top cover 16. The pair of nail portions 53 of the top plate 50a are in engagement with the outer surfaces of upper end portions of the opposing long side walls 12b.

The side plate 50b of the protective cover 50 is positioned facing the outer surface 15b of the short side wall 12c of the housing 10. The side plate 50b extends from the top plate 50a to near the lower end of the short side wall 12c and near the interface connector 44, and covers approximately the entire side surface 15b of the short side wall 12c. The shock absorber 51 is sandwiched between the short side wall 12c and the side plate 50b. The shock absorber 51 is attached to the inner surface of the side plate 50b e.g. with an adhesive or a double-sided tape, and is attached to the side surface 15b of the short side wall 12c e.g. with an adhesive or a double-sided tape. The side plate 50b is thus fixed to the short side wall 12c via the shock absorber 51. Thus, the shock absorber 51 is sandwiched between the short side wall 12c and the side plate 50b, and is entirely covered with the side plate 50b.

As shown in FIG. 14, when the side plate 50b is on the short side wall 12c, part of the shock absorber 51, corresponding to approximately half the thickness of the shock absorber 51 (length of the shock absorber 51 in the first direction X) of the shock absorber 51, is absorbed by the reduction dP in the thickness of the short side wall 12c. Thus, even when the shock absorber 51 is attached, the length L1 of the HDD, including the side plate 50b and the shock absorber 51, in the first direction X can be reduced by the reduction dP, whereby the length L1 can be made to fall within a predetermined standard range. In one example, the length L1 is set not more than 147 mm.

The other construction of the HDD according to the second embodiment is the same as the above-described construction of the HDD according to the first embodiment. The HDD according to the second embodiment can achieve the same effect as the above-described effect of the HDD according to the first embodiment. According to the second embodiment, it is possible to provide a magnetic disk apparatus having improved impact resistance.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure. For example, the shape, dimensions and material of the protective cover and the shock absorber are not limited to those of the above-described embodiments; other shapes, dimensions and materials may be appropriately selected and used.

What is claimed is:

1. A disk apparatus comprising:
a housing including a base, the base including a bottom wall and a frame-like side wall standing upright along peripheral edges of the bottom wall, and a top cover joined to the base;
a rotatable disk-shaped recording medium disposed in the housing;
a protective cover including a top plate secured to the top cover and a side plate facing one side surface of the base;
a shock absorber sandwiched between the side plate and the one side surface of the base; and
a circuit board on which an interface connector is mounted, wherein the circuit board is mounted to the housing such that it faces the bottom wall of the housing, and wherein the interface connector has an edge which is positioned substantially aligned with an outer surface of the side plate.

2. The disk apparatus according to claim 1, wherein the shock absorber has a first main surface attached to the inner surface of the side plate, and a second main surface attached to the one side surface.

3. The disk apparatus according to claim 1, wherein the side plate covers the shock absorber entirely.

4. The disk apparatus according to claim 2, wherein the housing has a recess formed in the one side surface, the recess having a bottom surface at a certain depth, and wherein the shock absorber is disposed in the recess and attached to the bottom surface.

5. The disk apparatus according to claim 2,
wherein the side wall of the base includes a pair of long side walls facing each other and extending parallel to each other in a first direction, and a pair of short side walls facing each other and extending parallel to each other in a second direction, and wherein one of the short side walls has the one side surface that is located inwardly in the first direction with respect to an edge of the interface connector in the first direction by a distance that is at least a predetermined percentage of the thickness of the shock absorber.

6. The disk apparatus according to claim 5, wherein the predetermined percentage is 50%.

7. The disk apparatus according to claim 6, wherein a length of the housing, including the protective cover and the shock absorber, in the first direction is within a range specified in a standard for disk apparatuses.

8. The disk apparatus according to claim 1, wherein the housing further includes an inner cover secured to the base and closing an opening of the base, wherein the top cover is disposed such that it faces the inner cover, and a peripheral area of the top cover is bonded to the base by welding, and wherein a gas having a lower density than air is sealed in the housing.

9. The disk apparatus according to claim 1, wherein the dimensions of the housing, including the protective cover and the shock absorber, are each set within a range specified in a standard for disk apparatuses.

* * * * *